United States Patent Office 3,457,184
Patented July 22, 1969

3,457,184
PROCESS FOR PREPARING PHOSPHORS
Yoshichika Kobayashi, Ibaraki-shi, Mutsuo Masuda, Kyoto, and Hideo Mizuno and Setsuko Murayama, Takatsuki-shi, Japan, assignors to Matsushita Electronics Corporation, Osaka, Japan, a corporation of Japan
Filed Nov. 15, 1966, Ser. No. 594,614
Claims priority, application Japan, Nov. 22, 1965, 40/71,902
Int. Cl. C09k 1/36
U.S. Cl. 252—301.4                    10 Claims

ABSTRACT OF THE DISCLOSURE

Europium activated yttrium and gadolinium oxide phosphors having smooth particle surface, roundish particle shape, and controlled particle size are prepared by firing the coprecipitated compounds of the phosphor cations to oxides, adding flux, and refiring the oxides to the desired particle size and shape. The resultant phosphors are especially suitable for use in producing phosphor screens in Braun color tubes by the flow coating method.

---

The present invention relates to a production of luminescent compositions and, more particularly, to a process for preparing oxide phosphors comprising yttrium oxide and/or gadolinium oxide, or their solid solutions, with europium as an activator.

Luminescent compositions have utility in the preparation of luminescent coatings, screens, and the like. The phosphors prepared in accordance with the present invention have particular utility when employed in producing a screen for use in a Braun color tube. Thus, it is an object of the present invention to provide superior phosphors for use in producing a screen for a Braun tube. The phosphors of the present invention in powder form have a particle size distribution, shape and surface characteristics useful in the above mentioned application. The screen of a Braun tube generally consists of dots of phosphors which emit blue, green and red, respectively, upon excitation. A large number of such dots are regularly arranged on the inside surface of the panel of the Braun tube. In producing these dots, a suspension of a phosphor in an aqueous solution of a photosensitive resin (for example, polyvinyl alcohol to which ammonium bichromate is added) is applied, and then processed as in making a photoplate utilizing the photo-curing property of the photosensitive resin, that is, a process of coating-exposure-development is carried out. This operation is repeated with each color, blue, green and red. Because this special coating method is employed, control of the particle size of the phosphors is especially necessary. Moreover, since the coating is effected by a flow coating method, uniform dispersion in the suspension is required. In order to have such dispersion, the surface of the particle of the phosphor should be smooth and round.

Ultrafine particles of phosphor under 0.1 micron tend to adhere on the dots of other colors. They are not readily removable by the water rinsing in the development process. This adherence gives rise to mixed colors when reproducing a three-color picture image, impairing the tone or color quality reproducibility. Furthermore, the spaces between the particles of the phosphors composing the screen are decreased with the result that ultraviolet light does not penetrate to the boundary surface of the glass at exposure. Accordingly, the photo-curing of the photosensitive resin located near the glass surface is insufficient, and the adhesive force of the screen to the glass decreases causing unwanted removal of the dots by the water rinsing in the development process—the so-called "dot fall" phenomenon.

In the light of the facts above described, an average particle sizes of 3–6 micron and the minimum amounts of ultrafine particles are required of the phosphor for use in the Braun color tube.

We have proposed to obtain a phosphor by firing at 1100°–1250° C. yttrium oxide and/or gadolinium oxide to which europium as an activator and borax as a flux have been added or firing at 1000°–1150° C. yttrium oxide, gadolinium oxide and/or lanthanum oxide to which europium as an activator and lithium fluoride as a flux have been added. However, the phosphor so obtained is not satisfactory for use as a Braun tube screen without modification. The crystal growth is insufficient, its average particle size is small, and the phosphor consists of a large amount of ultrafine particles, perhaps because the firing temperature employed is relatively low, although the melting point of the oxides are very high, 2680° and 2330° C., respectively.

It has also been proposed in the Journal of Electrochemical Society, volume III, page 311 (1964) that coprecipitated salts obtained by adding oxalic acid to a mixed solution of yttrium nitrate or gadolinium nitrate with europium nitrate be dried, and fired at 1100° C.–1200° C. for 2–4 hours to produce phosphors having greater brightness than those obtained employing the oxides as the starting materials in the firing step. According to this method, it is possible to manufacture oxide phosphors with the desired particle size by controlling the particle size of the oxalates which is controllable by changing such reaction conditions during the coprecipitation step as the concentration of the nitrates, the concentration and amount of oxalic acid and the reaction temperature. The particle sizes of the phosphors obtained by firing the oxalates are approximately equal to the particle sizes of the oxalates. However, such prior art phosphors obtained by heat decomposing such oxalates have poor particle size distribution in that a large amount of ultrafine particles are formed and have poor particle configurations characterized by surface irregularities. The irregular configurations are apparently due to the formation of aggregates from single particles sintered together during the heat decomposition or firing step, which aggregates retain the contours of the hosts, the so-called skeletons. The surfaces of the particles are not smooth and have irregular indentations and protrusions, moreover, because the contours of the hosts are retained, the product configurations are irregular, abounding in angles. Additionally, as indicated above, substantial amounts of ultrafine particles are formed at the time of the heat decomposition step.

According to the present invention, oxide phosphors with high brightness are obtained by a two stage firing or heat treatment procedure in which in the first stage the product is chiefly oxides of yttrium or gadolinium with europium, and a second firing is carried out in the presence of at least one flux which is added at the end of the first stage. The phosphors obtained by this procedure are useful in producing a screen of a Braun tube.

The present invention will now be described more specifically in the following detailed description with reference to the drawings in which.

The present invention provides a method for producing an improved luminescent composition by employing a two stage firing or heat treatment as described above, characterized that precipitated compounds of yttrium and/or gadolinium with europium are heat decomposed to oxides by firing at 600°–1200° C. Then at least one flux such as lithium fluoride, sodium fluoride, barium fluoride strontium fluoride, calcium chloride, vanadium pentoxide, ammonium vanadate, borax, and boric acid, is added so that the total amount of flux falls within the range of 0.001–0.1 mole per mole of yttrium oxide and/or gadolinium oxide, or of their solid solution; and this mixture is further fired at 1000°–1400° C.

Preferably, the required europium oxide is added to yttrium oxide or gadolinium oxide, or mixtures thereof, or to a solid solution thereof. This mixture is dissolved and mixed into equivalent amounts of an acid such as nitric acid to prepare soluble salts in an acid solution. Then, these salts are coprecipitated by the addition of oxalic acid or the like in the form of the corresponding oxalates or the like. After these precipitates are dried at 100°–150° C., the first firing is carried out at 600°–1200° C. for 1–4 hours, to yield their oxides through heat-decomposition.

Figure 1:
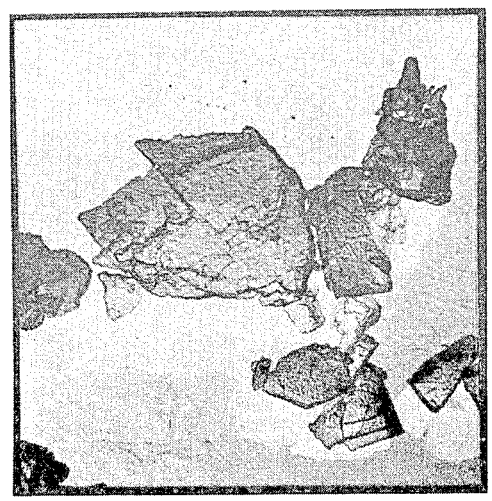
FIGURE 1 is an electron microscope photograph of an europium activated gadolinium oxide phosphor produced by conventional decomposition and firing of its its oxalic salt.
Figure 2:
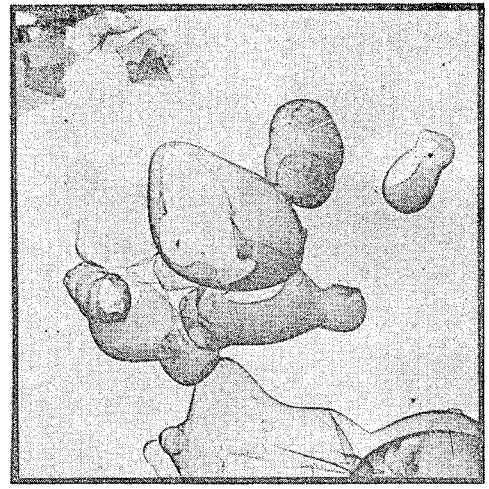
FIGURE 2 is an electron microscope photograph of an europium activated gadolinium oxide phosphor obtained by the method of this invention, with lithium fluoride used as the flux.

In the second step, one or more of the above listed flux compounds are added to the oxides formed in the first step in an amount such that the total amount of flux is about 0.001–0.1 mole of yttrium oxide and/or gadolinium oxide, or their solid solution. This mixture is then fired at 1000°–1400° C. for about 1 to 10 hours. The resulting product consists of oxide phosphors having particles as shown in FIGURE 2. The particles depicted in FIGURE 2 have greater regularity than those of FIGURE 1. The phosphors produced according to the present invention form a superior screen for use in a Braun tube, and lead to an increase of about 5–10% in brightness as compared to the use of phosphors obtained by a single stage firing of the oxalates.

It should be noted that products usable as phosphors in certain applications may be obtained by carrying out a single stage firing at about 1100°–1200° C. to cause both the heat decomposition of compounds such as the oxalates, and also crystalization of the heat decomposed compounds. However, these products are similar to those shown in the electron microscope photograph of FIGURE 1 and are not suitable for use in the Braun color tube.

It is also noted that it is possible to obtain oxide phosphors by carrying out a single stage firing with the addition of a flux to compounds such as the oxalates as distinguished from the two stage firing of the present invention. However, when employing such a one stage firing, about 2–4 times as much flux is necessary, and the phosphors obtained by this procedure have ultrafine particles and an undesirably wide particle size distribution. Therefore, such phosphors are not suitable for use in a Braun tube.

Although the amount of flux employed in carrying out the invention may vary in the wide range of 0.001–0.1 moles, the particularly preferred amount of flux varies depending upon the combinations between such hosts as yttrium oxide or gadolinium oxide and the particular flux. For example, when the amount of europium added in the first stage falls within the range of 0.001–0.15 mole per mole of yttrium oxide or gadolinium oxide, about 0.02–0.05 mole of flux are preferred in order that the red fluorescence of europium be emitted at the highest efficiency.

The phosphors of the invention are susceptible to contamination by reaction with the crucible used during the firing steps. The stability of the phosphors to water may be improved by adding small amounts of stabilizers such as silicic acid anhydride, vanadium pentoxide and similar acidic oxide substances, in addition to the above mentioned flux compounds.

Further details of the present invention will be described by way of the following specific examples:

Example 1

0.04 mole of europium oxide are added to one mole of gadolinium oxide. This mixture is dissolved in an equivalent amount of nitric acid to produce nitrates, and the solution is diluted with water to 2000 cc. This solution is heated to 80° C., and while being stirred, a 20% solution of oxalic acid heated to 80° C. is added in 5 minutes in an amount to provide 5 mole percent of oxalic acid in excess. After further stirring for 20 minutes, followed by standing, the oxalates had precipitated. The precipitates are water-rinsed to pH 6.0–6.5, then dried at 100°–150° C., and are finally decomposed into oxides by carrying out a first firing at 800° C. for 2 hours.

Subsequently, 0.05 mole of lithium fluoride is added to these oxides per mole thereof. After thorough mixing, a second firing is carried out at 1200° C. for 3 hours. Then, phosphors having smooth particle surface, roundish in shape and having very few ultrafine particles are obtained.

Figure 3:
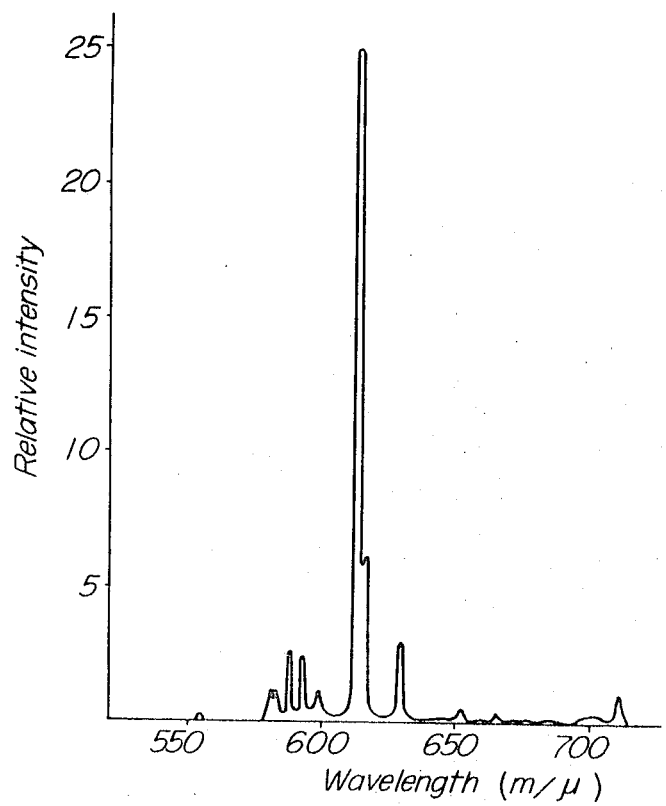
FIGURES 3 is an energy distribution curve for the phosphor of FIGURE 2.

The phosphors obtained in this way emit luminous red fluorescence when excited by cathode rays or by 2537 A. ultraviolet light. The energy distribution in the case of cathode ray excitation is shown in FIGURE 3. When these phosphors were applied on a Braun tube, about an 8% increase in brightness was observed as compared with the the conventional phosphors obtained by firing the oxalates in a single stage firing without the addition of fluxes.

Example 2

0.04 mole of europium oxide were added to one mole of yttrium oxide. This mixture was dissolved in an equivalent amount of nitric acid, and was diluted with water to 2000 cc. This solution was heated to 80° C. and while being stirred, 20% solution of oxalic acid at 80° C. was added, drop by drop, in 5 minutes in such an amount as to add 5 mole percent of oxalic acid in excess. After a further 20 minute stirring and standing, the oxalates precipitated. They were water rinsed by a decantation to be pH 6.0–6.5, dried at 100°–150° C., and then, decomposed into oxides by carrying out a first firing at 1000° C. for 1.5 hours. Subsequently, borax was added to these oxides in the proportion of 0.005 mole of borax per mole of the latter, and then, the second firing was carried out at 1200° C. for 4 hours. Phosphors like those obtained in Example 1 were obtained. The increase in brightness when they were applied on the Braun tube was about 5%.

Example 3

0.04 mole of europium oxide were added to 0.3 mole of yttrium oxide and 0.7 mole of gadolinium oxide. The mixture was dissolved in an equivalent amount of nitric acid, then diluted with water to 2000 cc. This solution was heated to 80° C., and while being stirred, 20% solution of oxalic acid heated to 80° C., was added, drop by drop, in 5 minutes in such an amount as to have 5 mole percent of oxalic acid in excess. After a further 20 minute stirring and standing, the oxalates precipitated. They were then water rinsed by decantation until their pH became 6.0–6.5, dried at 100°–150° C., and were converted into oxides by carrying out the first firing at 1000° C. for one hour.

Subsequently, 0.03 mole of strontium fluoride were added to these oxides per mole thereof, and the second firing was carried out at 1300° C. for 3 hours. In this way, phosphors quite similar to those obtained in Example 1 were obtained.

In each example described above, nitric acid was used in dissolving the rare earth oxides. However, other inorganic acids, for example, hydrochloric acid, sulfuric acid and the like, can be used. In lieu of oxalic acid, there may be employed any precipitating agent that produces precipitates of the slightly soluble rare earth cations in the mixed solutions of the soluble salts. Other suitable agents include, other organic acids such as tartaric acid, and ammonium carbonate which easily produce oxides during the firing.

As is evident from the above explanation, according to this invention phosphors having smooth particle surface, roundish shape, having very little ultrafine particles, and with patricle size distribution suitable for use in a Braun color tube, are obtainable. The phosphors obtained in this way are easily applied on the Braun tube, and superior screens are thereby produced. With them, the brightness is improved by about 5–10% as compared with conventional phosphors.

What is claimed is:

1. A process for preparing a luminescent composition comprising preparing a solution of (a) salts of an element selected from the group consisting of yttrium and gadolinium and mixtures thereof with (b) a salt of europium, forming precipitates from the salts in said solution, drying said precipitates, and heating said precipitates at about 600°–1200° C. to form oxides from said precipitates, adding about 0.001–0.1 mole of flux per mole of the oxide of said element, and heating the thus formed mixture at about 1000°–1400° C. to form phosphors.

2. A process according to claim 1, wherein said precipitates are heated at 600°–1200° C. for about 1–4 hours.

3. A process according to claim 2, wherein said mixture is heated at 1000°–1400° C. for about 1–10 hours.

4. A process according to claim 1, wherein said flux is selected from the group consisting of lithium fluoride, sodium fluoride, barium fluoride, strontium fluoride, calcium chloride, vanadium pentoxide, ammonium vanadate, borax, boric acid, and mixtures thereof.

5. A process according to claim 1, wherein said flux is lithium fluoride.

6. A process according to claim 1, wherein said flux is borax.

7. A process according to claim 1, wherein said flux is strontium fluoride.

8. A process according to claim 1, wherein said precipitates are formed by adding oxalic acid to said salts.

9. A process according to claim 1, wherein the solution of salts is prepared by adding an inorganic acid to a mixture of europium oxide and at least one oxide selected from the group consisting of yttrium oxide and gadolinium oxide.

10. A process according to claim 9, wherein said salts are nitrates.

References Cited

UNITED STATES PATENTS

| | | | |
|---|---|---|---|
| 3,322,682 | 5/1967 | Thompson | 252—301.4 |
| 3,368,980 | 2/1968 | Avella | 252—301.4 |

TOBIAS E. LEVOW, Primary Examiner

R. D. EDMONDS, Assistant Examiner